(12) United States Patent
Yamamoto et al.

(10) Patent No.: US 12,228,815 B2
(45) Date of Patent: Feb. 18, 2025

(54) DISPLAY DEVICE AND COLOR FILTER SUBSTRATE

(71) Applicant: Japan Display Inc., Tokyo (JP)

(72) Inventors: Tetsuya Yamamoto, Tokyo (JP); Tatsuaki Kuji, Tokyo (JP); Satoru Kawasaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/739,479

(22) Filed: Jun. 11, 2024

(65) Prior Publication Data

US 2024/0427187 A1    Dec. 26, 2024

(30) Foreign Application Priority Data

Jun. 21, 2023 (JP) ................... 2023-101722

(51) Int. Cl.
  *G09G 3/20* (2006.01)
  *G02F 1/1335* (2006.01)

(52) U.S. Cl.
  CPC .. *G02F 1/133514* (2013.01); *G02F 1/133512* (2013.01)

(58) Field of Classification Search
  CPC ......... G02F 1/133514; G02F 1/133512; G02F 1/133509; G02F 1/136222; G02F 2203/34; G02F 1/1352; G02F 1/1351
  See application file for complete search history.

(56) References Cited

U.S. PATENT DOCUMENTS

| | | | |
|---|---|---|---|
| 2001/0025958 A1 | 10/2001 | Yamazaki et al. | |
| 2015/0370105 A1* | 12/2015 | Hong | G02F 1/133512 349/110 |
| 2016/0133173 A1* | 5/2016 | Tsai | G02F 1/136286 345/694 |
| 2017/0371199 A1* | 12/2017 | Maede | G02F 1/1335 |
| 2022/0146896 A1 | 5/2022 | Itou | |

FOREIGN PATENT DOCUMENTS

| | | | | |
|---|---|---|---|---|
| CN | 103513478 A | * | 1/2014 | ....... G02F 1/133512 |
| CN | 103941490 A | * | 7/2014 | ....... G02F 1/133707 |
| JP | H6-273614 A | | 9/1994 | |
| JP | 3329206 B2 | | 9/2002 | |
| JP | 2006-293385 A | | 10/2006 | |
| JP | 2021026040 A | | 2/2021 | |

* cited by examiner

Primary Examiner — Hoan C Nguyen
(74) Attorney, Agent, or Firm — Maier & Maier, PLLC (57) ABSTRACT

According to one embodiment, a display device includes a first substrate including a plurality of pixels, a second substrate opposed comprising a plurality of color filters and a light-shielding layer, and a liquid crystal layer. The plurality of pixels include a plurality of first pixels arranged in an oblique direction and a plurality of second pixels adjacent to each of the plurality of first pixels. The plurality of color filters include a first color filter extending in the oblique direction to overlap with the plurality of first pixels and a second color filter extending in the oblique direction to overlap with the plurality of second pixels. The light-shielding layer extends to overlap with a boundary portion between the first and second color filters.

9 Claims, 11 Drawing Sheets

DISPLAY DEVICE AND COLOR FILTER SUBSTRATE

CROSS-REFERENCE TO RELATED APPLICATIONS

This application is based upon and claims the benefit of priority from Japanese Patent Application No. 2023-101722, filed Jun. 21, 2023, the entire contents of which are incorporated herein by reference.

FIELD

Embodiments described herein relate generally to a display device and a color filter substrate.

BACKGROUND

A display device including an array substrate (TFT substrate) on which switching elements are arranged such as a thin-film transistor (TFT), a color filter substrate on which color filters are arranged, and a liquid crystal layer held between the array substrate and the color filter substrate is commonly known.

When high definition is achieved in such a display device, a display quality of the display device may degrade depending on a pattern of color filters formed on the color filter substrate.

DETAILED DESCRIPTION

In general, according to one embodiment, a display device includes a first substrate including a plurality of pixels arranged in a matrix in a first direction and a second direction, a second substrate opposed to the first substrate and including a plurality of color filters corresponding to the plurality of pixels and a light-shielding layer, and a liquid crystal layer held between the first substrate and the second substrate. The plurality of pixels include a plurality of first pixels arranged in an oblique direction with respect to the first direction and the second direction and a plurality of second pixels adjacent to each of the plurality of first pixels in the first direction and arranged in the oblique direction. The plurality of color filters include a first color filter configured to extend in the oblique direction to overlap with the plurality of first pixels and a second color filter configured to extend in the oblique direction to overlap with the plurality of second pixels. The light-shielding layer is configured to extend in the oblique direction to overlap with a boundary portion between the first color filter and the second color filter.

Each of embodiments will be described hereinafter with reference to the accompanying drawings.

The disclosure is merely an example, and proper changes within the spirit of the invention, which are easily conceivable by a person of ordinary skill in the art, are included in the scope of the invention as a matter of course. In addition, in some cases, in order to make the description clearer, the drawings are schematically illustrated as compared to the actual modes, but the schematic illustration merely shows an example and adds no restriction to the interpretation of the invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

First Embodiment

Figure 1:
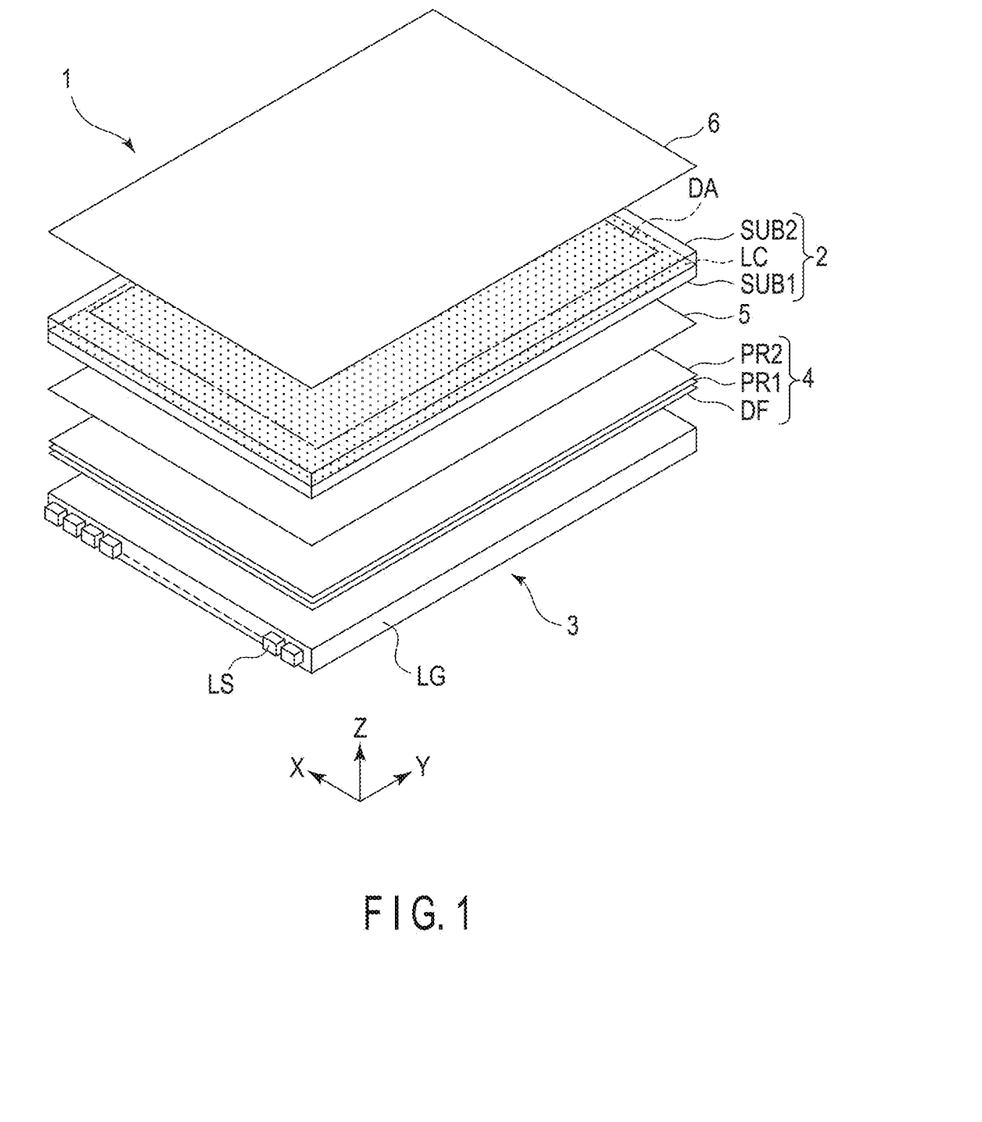
FIG. 1 is a schematic exploded perspective view showing a display device according to a first embodiment.

FIG. 1 is a schematic perspective view showing a display device 1 according to a first embodiment. An X direction, a Y direction, and a Z direction are defined as shown in figures. The directions X, Y, and Z are orthogonal to each other in the present embodiment, but may intersect at an angle other than 90 degrees. In addition, viewing the display device 1 and its components parallel to the Z direction is referred to as plan view. A direction indicated by an arrow of the Z direction is referred to as "above/over", and an opposite direction of the arrow is referred to as "under/below" in some cases.

The display device 1 includes a display panel 2 and a backlight 3. In the example shown in FIG. 1, the backlight 3 is a side-edge type backlight including a light guide LG opposed to the display panel 2, and a plurality of light emitting elements LS opposed to a side of the light guide LG. The configuration of the backlight 3 is not limited to the example shown in FIG. 1. The backlight 3 may be configured to supply light necessary to display images.

In the example shown in FIG. 1, the display panel 2 and the light guide LG are formed in a rectangular shape having shorter sides along the X direction and longer sides in the Y direction. The shapes of the display panel 2 and the light guide LG are not limited to a rectangle but may be other shapes.

The display panel 2 is a transmissive liquid crystal panel and includes a first substrate SUB1 (array substrate), a second substrate SUB2 (counter-substrate) opposed to the first substrate SUB1, and a liquid crystal layer LC sealed (held) between the first substrate SUB1 and the second substrate SUB2. The display panel 2 has a display area DA in a rectangular shape, for example.

The display device 1 further includes an optical sheet group 4, a first polarizer 5, and a second polarizer 6. The optical sheet group 4 is arranged between the light guide LG and the display panel 2. For example, the optical sheet group 4 includes a diffusion sheet DF diffusing light emitted from the light guide LG and a first prism sheet PR1 and a second prism sheet PR2 on which a number of prism lenses are formed.

The first polarizer 5 is arranged between the optical sheet group 4 and the first substrate SUB1. The second polarizer 6 is arranged above the second substrate SUB2. The polarization axis of the first polarizer 5 and the polarization axis of the second polarizer PL6 are, for example, in a crossed Nicol positional relationship in which these polarization axes are orthogonal to each other.

The display device 1 can be used for, for example, various devices (electronic apparatus) such as a vehicle-mounted device, a smartphone, a tablet, a mobile telephone, a personal computer, a TV receiver, a game console, and a head-mounted display displaying images for virtual reality (VR).

Figure 2:
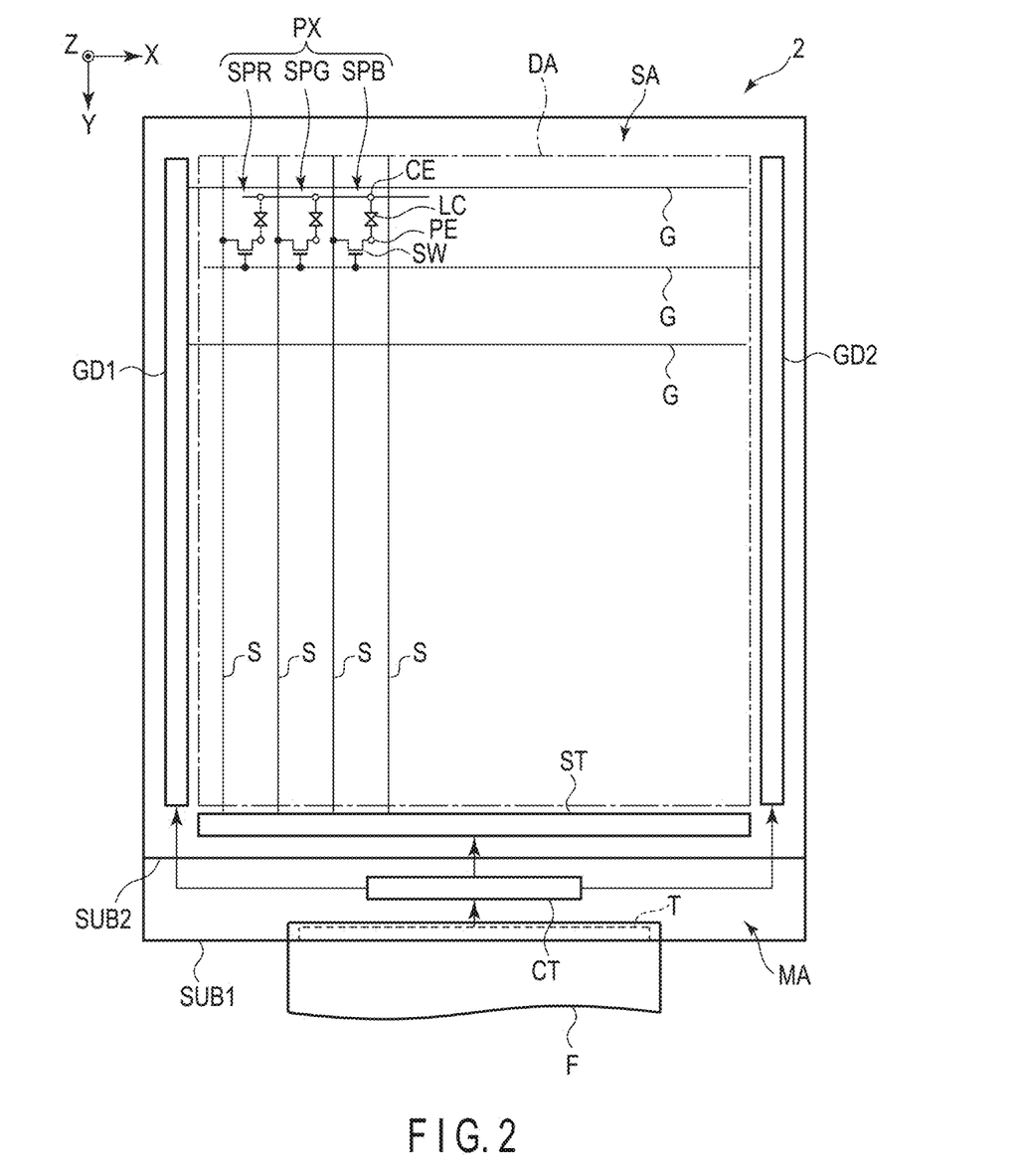
FIG. 2 is a schematic plan view of a display panel.

FIG. 2 is a schematic plan view of the display panel 2. The display panel 2 has the display area DA and a surrounding area SA around the display area DA. In the example of FIG. 2, a lower side of the first substrate SUB1 in the figure protrudes beyond the second substrate SUB2 in the Y direction. Thus, the first substrate SUB1 has a mounting area MA, which does not overlap with the second substrate SUB2. The mounting area MA is a part of the surrounding area SA.

The plurality of pixels PX are arranged in a matrix in the display area DA. The display device 1 of the present embodiment adopts sub-pixels rendering for increasing resolution in a pseudo manner. In this case, the pixel PX includes a plurality of sub-pixels. In the present embodiment, the pixel PX includes a red sub-pixel SPR, a green sub-pixel SPG, and a blue sub-pixel SPB. The pixel PX may include a sub-pixel SP displaying the other color such as white.

The display panel 2 includes a plurality of scanning lines G, a plurality of signal lines (video lines) S, a first scan driver GD1, a second scan driver GD2, and a selector circuit ST. The plurality of scanning lines G extend in the X direction and are arranged in the Y direction. The plurality of signal lines S extend in the Y direction and are arranged in the X direction. Each of the scanning lines G is connected to at least one of the first scan driver GD1 and the second scan driver GD2. Each of the signal lines S is connected to the selector circuit ST.

In the example in FIG. 2, a controller CT is mounted on the mounting area MA. In addition, a terminal portion T is provided in the mounting area MA, and a flexible printed circuit F is connected to the terminal portion T. Incidentally, the controller CT may be mounted on the flexible printed circuit F. The controller CT can be composed of IC and various circuit elements.

The flexible printed circuit F inputs various signals, which are sent from the substrates and the like of the electronic device on which the display device 1 is mounted, to the controller CT. The controller CT uses these input signals to supply the selector circuit ST with video signals and control the first scan driver GD1, the second scan driver GD2, and the selector circuit ST. The first scan driver GD1 and the second scan driver GD2 sequentially supply each of the scanning lines G with a scanning signal. The selector circuit ST sequentially supplies the signal line S with the input video signal.

The pixel PX includes a pixel electrode PE, a switching element SW (thin-film transistor), and a common electrode CE, which is to be supplied with a common voltage. The switching element SW is connected to the pixel electrode PE, the scanning line G, and the signal line S. When the scanning line G is supplied with the scanning signal, the switching element SW supplies the pixel electrode PE with the video signals of the signal line S. The common electrode CE is formed to spread across the plurality of sub-pixels. When the pixel electrode PE is supplied with the video signals, a potential difference is formed between the pixel electrode PE and the common electrode CE. An electric field generated by the potential difference acts on the liquid crystal layer LC.

In the present embodiment, the scanning line G, the signal line S, the first scan driver GD1, the second scan driver GD2, the selector circuit ST, the switching element SW, the pixel electrode PE, and the common electrode CE all are formed on the first substrate SUB1.

Figure 3:
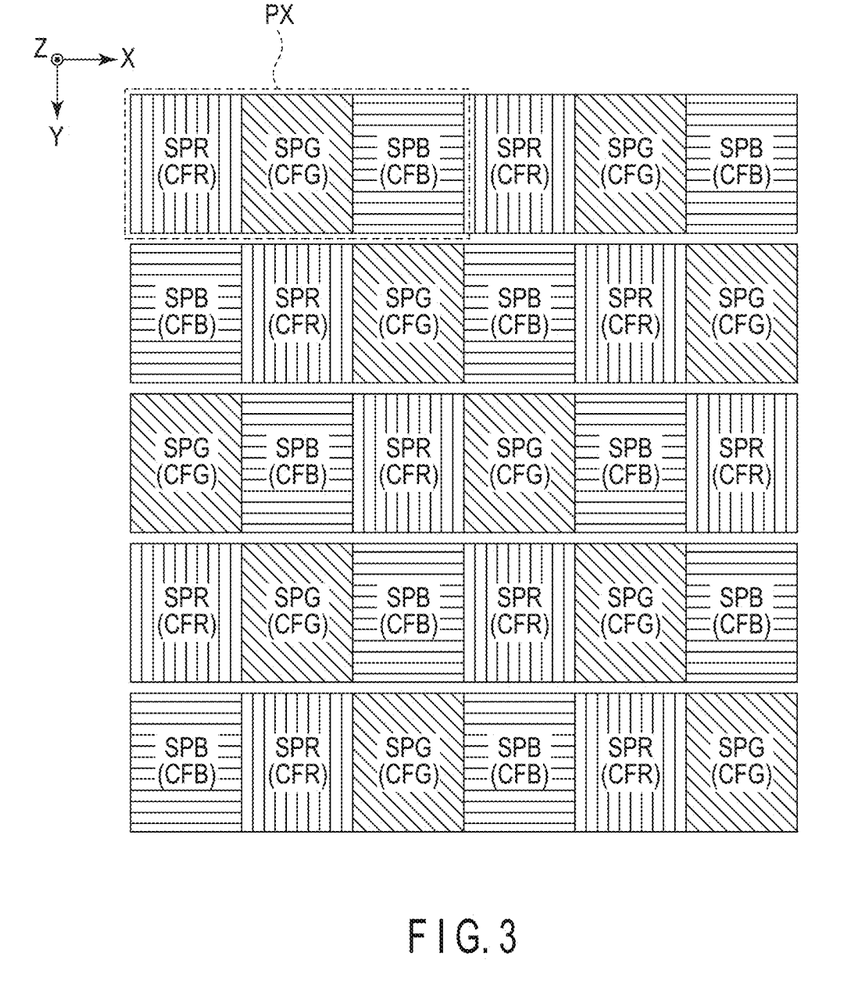
FIG. 3 is a schematic plan view showing an example of a layout of sub-pixels.

FIG. 3 is a schematic plan view showing an example of a layout of sub-pixels SPR, SPG, and SPB (pixels PX). The sub-pixels SPR are sub-pixels configured to display red by arranging a red color filter CFR as a color filter corresponding to the sub-pixel SPR. The sub-pixels SPG are sub-pixels configured to display green by arranging a green color filter CFG as a color filter corresponding to the sub-pixel SPG. The sub-pixels SPB are sub-pixels configured to display blue by arranging a blue color filter CFB as a color filter corresponding to the sub-pixel SPB.

In the example of FIG. 3, the sub-pixel SPR, the sub-pixel SPG, and the sub-pixel SPB are arranged in this order. In addition, the sub-pixel SPR, the sub-pixel SPB, and the sub-pixel SPG are arranged in this order. Thus, the plurality of sub-pixels SPR are arranged in an oblique direction intersecting the X direction and the Y direction. In addition, the plurality of sub-pixels SPG are adjacent to each of the plurality of sub-pixels SPR in the X direction and are arranged in the oblique direction, similarly to the sub-pixel SPR. In addition, the plurality of sub-pixels SPB are adjacent to each of the plurality of sub-pixels SPG in the X direction and are arranged in the oblique direction, similarly to the sub-pixels SPR and SPG.

In addition, the present embodiment must have the configuration in which the plurality of sub-pixels SPR, SPG, and SPB are arranged in the oblique direction (in other words, arranged in a tessellated pattern) as described above. The sub-pixels SPR, SPG, and SPB may be arranged in an oblique direction different from one shown in FIG. 3. In addition, the longitudinal length to the lateral length of the sub-pixels SPR, SPG, and SPB may be designed as 1:2, 2:3, for example.

Figure 4:
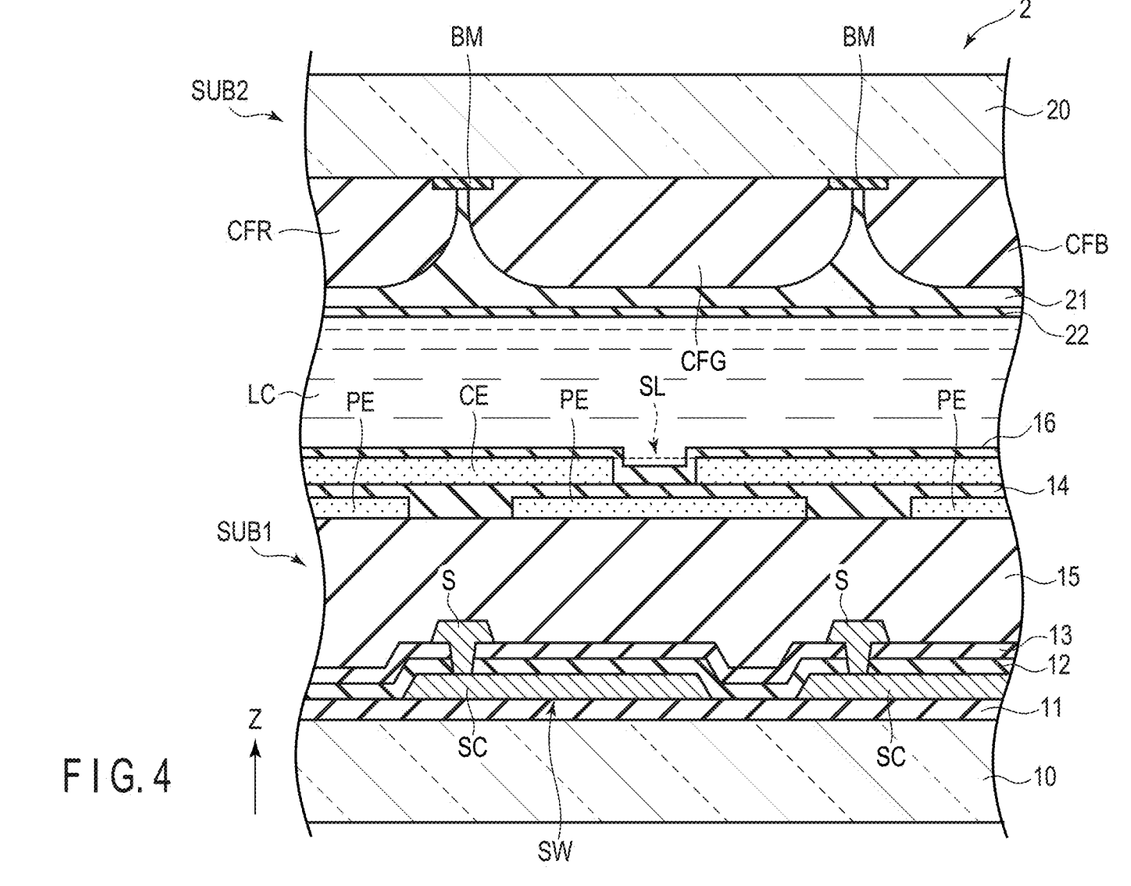
FIG. 4 is a schematic cross-sectional view showing the display panel.

FIG. 4 is a schematic cross-sectional view showing the display panel 2. The first substrate 1 includes the signal line S, the switching element SW, the pixel electrode PE, and the common electrode CE. Though not shown in FIG. 4, the first substrate SUB 1 includes the scanning line G.

Further, the first substrate SUB1 includes a first insulating base 10, a first insulating layer 11, a second insulating layer 12, a third insulating layer 13, a fourth insulating layer 14, an organic insulating layer 15, and a first alignment film 16.

The first insulating base 10 is formed of glass, for example. The first insulating base 10 may be formed of resin material such as polyimide. The first to fourth insulating layers are formed of inorganic material such as silicon nitride and silicon oxide. The organic insulating layer 15 is formed of organic material such as acrylic resin. The pixel electrode PE and the common electrode CE are formed of a transparent conductive material such as ITO. The scanning line G and the signal line S are formed of metallic material. The scanning line G and the signal line S may include a single-layer structure formed of a single metallic material or may include a multilayer structure in which metallic materials different from each other are stacked.

The first insulating layer 11 covers an upper surface (surface of the second substrate SUB2 side) of the first insulating base 10. A semiconductor layer SC such as polysilicon, the semiconductor layer SC being included in the switching element SW, is arranged on the first insulating layer 11. The second insulating layer 12 covers the semiconductor layer SC and the first insulating layer 11.

Though not shown in FIG. 4, the scanning line G is arranged on the second insulating layer 12. The scanning line G and the semiconductor layer SC intersect with each other at least once. The third insulating layer 13 covers the scanning line G and the second insulating layer 12. The signal line S is arranged on the third insulating layer 13. The signal line S is in contact with the semiconductor layer SC through a contact hole which penetrates the second insulating layer 12 and the third insulating layer 13.

The organic insulating layer 15 covers the signal line S and the third insulating layer 13. The organic insulating layer 15 is formed to be thicker than the first to fourth insulating layers 11 to 14. The organic insulating layer 15 planarizes uneven parts generated by the switching element SW and the like.

The pixel electrode PE is arranged on the organic insulating layer 15. The pixel electrode PE is in contact with the semiconductor layer SC through a contact hole (not shown) penetrating the organic insulating layer 15. Other conductive layers may be interposed between the pixel electrode PE and the semiconductor layer SC.

The fourth insulating layer 14 covers the pixel electrode PE and the organic insulating layer 15. The common electrode CE is arranged on the fourth insulating layer 14. The common electrode CE includes a slit SL overlapping with the pixel electrode PE in plan view. The common electrode CE is covered with the first alignment film 16.

The second substrate SUB2 includes a second insulating base 20 formed of the same material as that of the first insulating base 10, a black matrix BM (light-shielding layer), the color filters CFR, CFG, and CFB, an organic insulating layer 21, and a second alignment film 22.

The black matrix BM is arranged on a lower surface of the second insulating base 20 (surface of the first substrate SUB1 side).

The color filters CFR, CFG, and CFB are arranged at a position lower than the second insulating base 20 and the black matrix BM.

The organic insulating layer 21 covers the color filters CFR, CFG, and CFB. The organic insulating layer 21 planarizes uneven parts generated by the color filters CFR, CFG, and CFB. The organic insulating layer 21 is covered with the second alignment film 22.

The first substrate SUB1 and the second substrate SUB2 are bonded to each other in the surrounding area SA by an annular sealing material. The liquid crystal layer LC is sealed between the first substrate SUB1 and the second substrate SUB2.

In the display device 1, when the pixel electrode PE is supplied with the video signal, an electric field is formed between the pixel electrode PE and the common electrode CE. This electric field acts on the liquid crystal layer LC through the slit SL to control alignment of liquid crystal molecules included in the liquid crystal layer LC.

Figure 5:
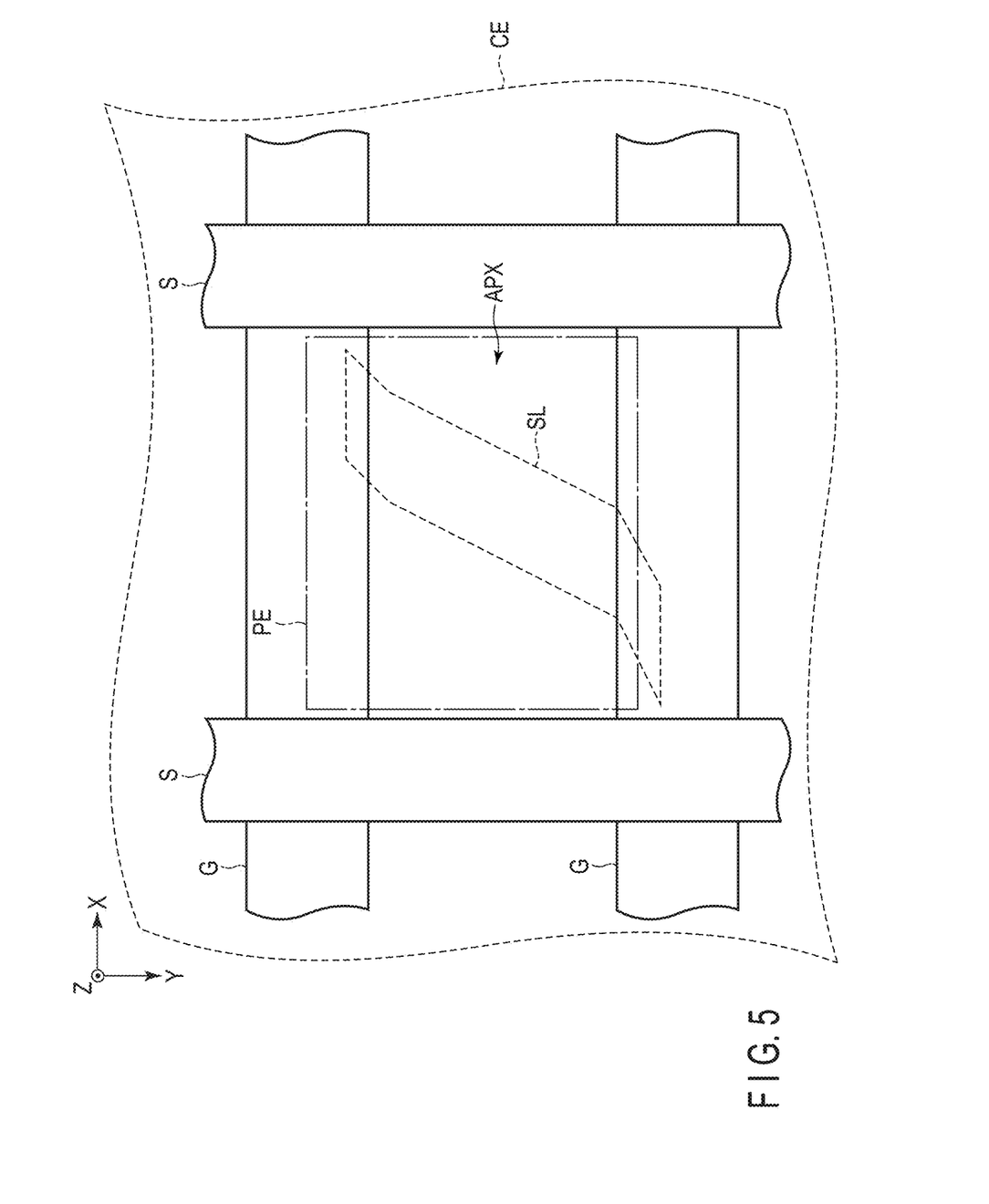
FIG. 5 is a schematic plan view showing some of elements arranged on a first substrate in a display area.

FIG. 5 is a schematic plan view showing some of elements arranged on the first substrate SUB1 in the display area DA. FIG. 5 focuses on a sub-pixel and shows two scanning lines extending in the X direction and adjacent to each other in the Y direction and two signal lines S extending in the Y direction and adjacent to each other in the X direction. In the display area DA, an aperture APX surrounded by these two scanning lines G and two signal lines S is formed for each of the sub-pixels. The pixel electrode PE overlaps with a most part of the aperture APX.

As shown in FIG. 5, the common electrode CE includes a slit SL in an area overlapping with the apertures APX. The slit SL includes a plurality of portions inclined with respect to the X direction and the Y direction, for example. The plurality of slits SL may be provided for the aperture APX.

As described above, when high definition is achieved in the display device 1 in which the first substrate SUB1 (array substrate) and the second substrate SUB2 (color filter) are bonded to each other, a display quality of the display device 1 may degrade depending on a pattern of the color filters CFR, CFG, and CFB.

More specifically, as shown in FIG. 3, when the sub-pixels SPR, SPG, and SPB are arranged in the tessellated pattern, each of the color filters CFR, CFG, and CFB corresponding to the sub-pixels SPR, SPG, and SPB respectively needs to be formed as an individual pattern. The accuracy of patterning for forming these color filters CFR, CFG, and CFB is not sufficient, these color filters CFR, CFG, and CFB may be detached from some of the apertures APX formed in the sub-pixels SPR, SPG, and SPB and form voids. In addition, when color filters of the same color formed as an individual pattern in the oblique direction are connected to each other, the connected portion overlaps with the aperture APX formed in the adjacent sub-pixel in the X direction, for example. In addition, the thickness of the connected portion may increase and cause inconveniences such as penetrating an overcoat layer (organic insulating layer 21).

Therefore, in the present embodiment, the configuration in which the degradation in display quality in the display device 1, which may be caused by pattern (shapes, arrangements, and the like) of the color filters CFR, CFG, and CFB, is suppressed is proposed.

Figure 6:
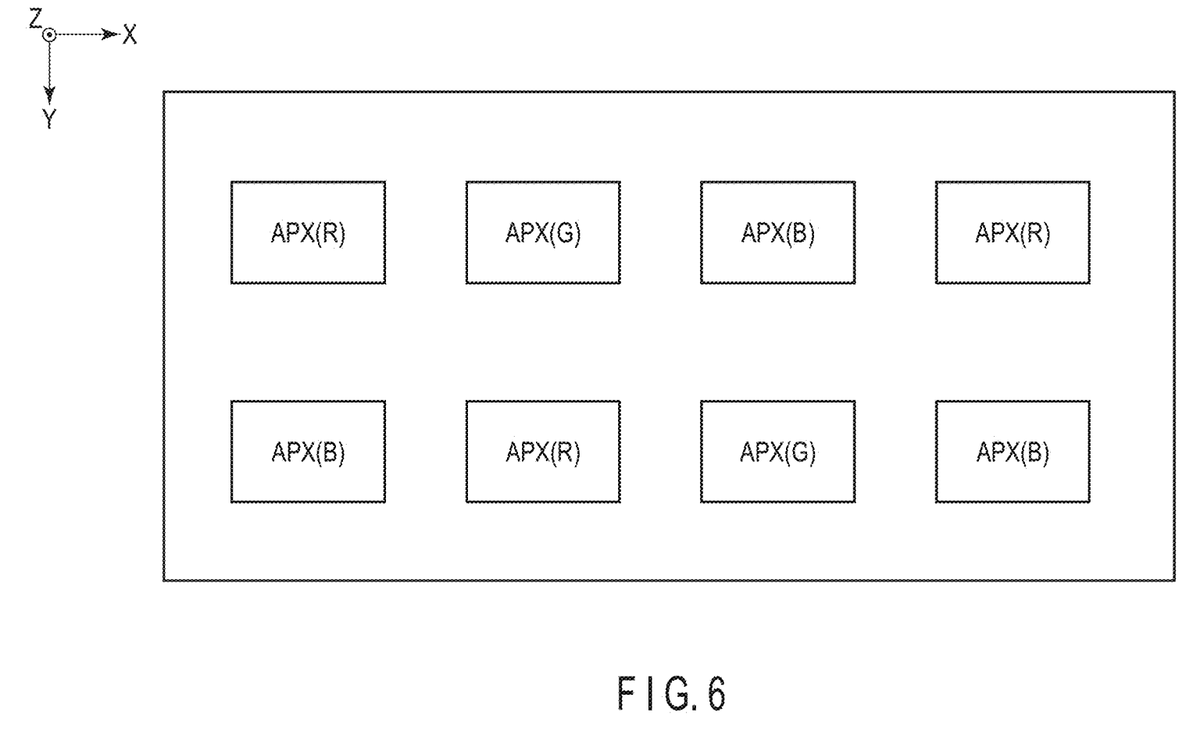
FIG. 6 shows an arrangement of apertures formed in a plurality of sub-pixels in plan view.

FIG. 6 shows apertures APX (R), APR (G), and APX (B) formed in the plurality of sub-pixels SPR, SPG, and SPB in plan view. Here, it is assumed that the plurality of sub-pixels SPR, SPG, and SPB are arranged as shown in FIG. 3. The apertures APX(R) are apertures formed in the plurality of sub-pixels SPR shown in FIG. 3. The apertures APX(G) are apertures formed in the plurality of sub-pixels SPG shown in FIG. 3. The apertures APX(B) are apertures formed in the plurality of sub-pixel SPB shown in FIG. 3.

Though not shown in FIG. 6, the apertures APX(R), APX(G), and APX(B) are arranged at a position defined by the plurality of scanning lines G extending in the X direction and arranged in the Y direction and the signal lines S extending in the Y direction and arranged in the X direction.

Figure 7:
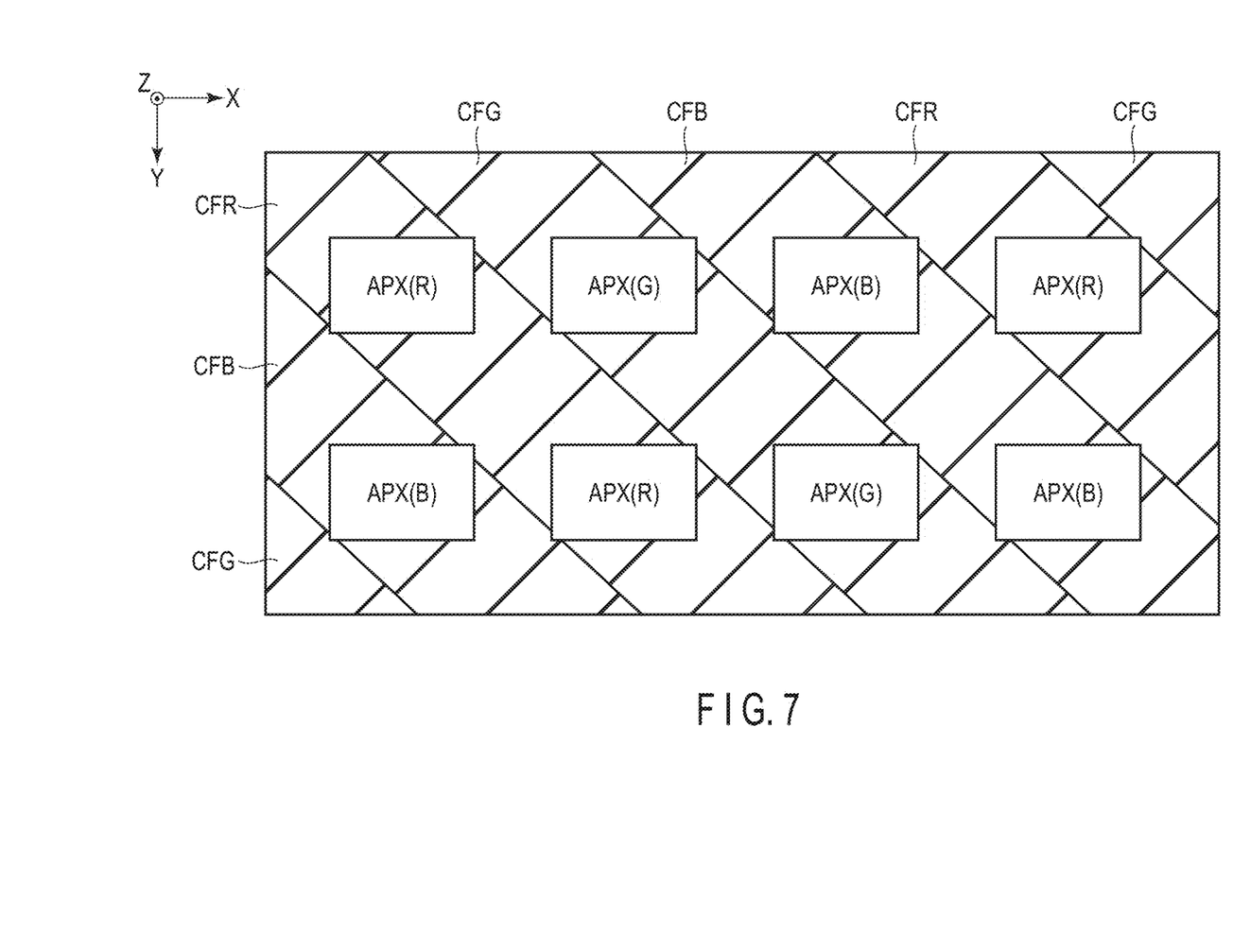
FIG. 7 shows positional relationships between the apertures formed in the plurality of sub-pixels and color filters in plan view.

FIG. 7 shows a positional relationship between the apertures APX(R), APX(G), and APX(B) and the color filters CFR, CFG, and CFB in the present embodiment.

As shown in FIG. 7, in the present embodiment, the color filter CFR extends to overlap with the aperture APX(R) formed in each of the plurality of sub-pixels SPR arranged in the oblique direction relative to the X direction and the Y direction. Similarly, in the present embodiment, the color filter CFG extends to overlap with the aperture APX(G) formed in each of the plurality of sub-pixels SPG arranged in the oblique direction relative to the X direction and the Y direction. Further, in the present embodiment, the color filter CFB extends to overlap with the aperture APX(B) formed in each of the plurality of sub-pixels SPB arranged in the oblique direction relative to the X direction and the Y direction.

In the present embodiment, a width of each of the color filters CFR, CFG, and CFB (width in a direction orthogonal to the oblique direction along which the color filters CFR, CFG, and CFB extend) is constant, for example.

When the color filter CFR is arranged in a manner shown in FIG. 7, the color filter CFR overlaps with a part of the aperture APX(G) and a part of the apertures APX(B). When the color filter CFG is arranged in a manner shown in FIG. 7, the color filter CFG overlaps with a part of the aperture APX(R) and a part of the apertures APX(B). When the color filter CFB is arranged in a manner shown in FIG. 7, the color filter CFB overlaps with a part of the aperture APX(R) and a part of the apertures APX(G). In these cases, chromaticity deviation may occur between the sub-pixels SPR, SPG, and SPB.

In FIG. 7, adjacent color filters among the color filters CFR, CFG, and CFB are arranged to be in contact. The color filters CFR, CFG, and CFB may be arranged to have gaps. Though not shown, when the color filters CFR, CFG, and CFB are arranged to have gaps, a part of the aperture APX(R), a part of the aperture APX(G), and a part of the aperture APX(B) may not overlap with the color filters CFR, CFG, and CFB, forming voids.

Figure 8:
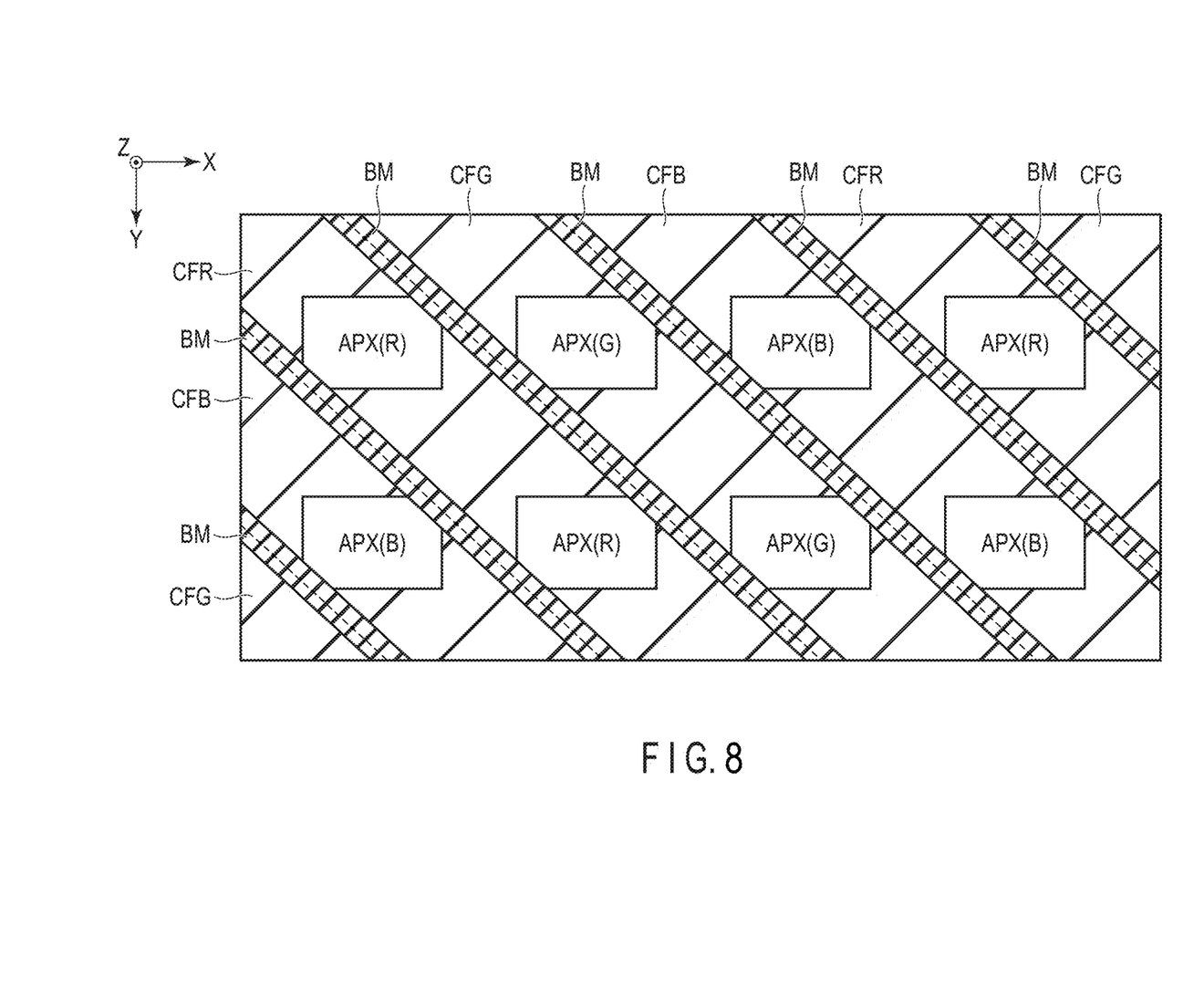
FIG. 8 shows an arrangement of a black matrix.

Considering this point, a black matrix BM extending to overlap with a boundary portion between adjacent color filters (first and second color filters) (fill gaps between adjacent color filters) is arranged in the present embodiment, as shown in FIG. 8.

More specifically, the black matrix BM overlaps with the boundary between the color filter CFR and the color filter CFG, a part of each of the plurality of apertures APX(R) arranged in the oblique direction, and a part of each of the plurality of apertures APX(G) arranged in the oblique direction.

Similarly, the black matrix BM overlaps with a boundary portion between the color filter CFG and the color filter CFB, a part of each of the plurality of apertures APX(G) arranged in the oblique direction, and a part of each of the plurality of apertures APX(B) arranged in the oblique direction.

In addition, the black matrix BM overlaps with a boundary portion between the color filter CFB and the color filter CFR, a part of each of the plurality of apertures APX(B) arranged in the oblique direction, and a part of each of the plurality of apertures APX(R) arranged in the oblique direction.

This configuration of the present embodiment allows the black matrix BM to shield light entering to a part of the apertures APX(G) and a part of the apertures APX(B), with which the color filter CFR arranged in an oblique direction overlaps. Thus, the degradation in display quality in the display device 1 can be suppressed in the present embodiment. The above explanations on the color filters CFR apply to the color filters CFG and CFB as well.

The display device 1 in which the common electrode CE is arranged above the pixel electrode PE (second substrate SUB2 side) is described with reference to FIG. 4. The display device 1 of the present embodiment may adopt the configuration in which the pixel electrode PE is arranged above the common electrode CE. In the configuration in which the pixel electrode PE is arranged above the common electrode CE, the slit SL does not need to be formed on the common electrode CE, and the slit SL is formed on the pixel electrode PE, instead of the common electrode CE.

In the present embodiment, the configuration in which the color filters CFR, CFG, and CFB are arranged on the second substrate SUB2 is described. The display device 1 of the present embodiment may be a Color Filter On Array (COA) type display device in which the color filters CFR, CFG, and CFB are arranged on the first substrate SUB1 (array substrate) side. In that case, as described in the present embodiment, a metal layer (light-shielding layer) that overlaps with a boundary portion between adjacent color filters may be arranged on the first substrate SUB1. In this case, the metal layer (light-shielding layer) provided on the first substrate SUB1 preferably is provided between the fourth insulating layer 14 and the first alignment film 16 shown in FIG. 4, and preferably is in contact with the common electrode CE. The shape of the metal layer (light-shielding layer) in plan view is the same as the pattern of the black matrix BM described with reference to FIG. 8 and the figures following it.

In the present embodiment, it is assumed that the second substrate SUB2 (color filter substrate) and the display area DA have a rectangular shape including a shorter side (first side) along the X direction and a longer side (second side) along the Y direction. The second substrate SUB2 and the display area DA may have a polygonal shape (for example, octagon) having a side along a direction intersecting the X direction and the Y direction.

Second Embodiment

Next, a second embodiment will be described. In the present embodiment, detailed descriptions of the same portions as those of the above-described first embodiment will be omitted, and the portions different from those of the first embodiment will be mainly described. In the present embodiment, the same portions as those in the figures referred by the above-described first embodiment will be described with denoted by the same reference numerals.

In the above-described first embodiment, it is described that the black matrix BM is arranged at a position overlapping with the boundary portion (for example, the boundary portion between the color filters CFR and CFG). The first embodiment assumes that the display device 1 is used for a head-mounted display and the like for displaying images for VR, for example, on a closed space (space in which the display device 1 is not irradiated with outer light and the like).

In contrast, in a display device 1 which displays images on a space irradiated with outer light, the outer light may be reflected at metal wiring line, degrading visibility of images displayed in the display device 1 (display area DA).

Thus, the display device 1 of the present embodiment has a configuration in which the black matrix BM is arranged to overlap with the boundary portion of the adjacent color filters and the metal wiring line that the display device 1 includes.

The present embodiment assumes that the metal wiring line included in the display device 1 is a scanning line G (scanning line G extending in the X direction for supplying switching elements SW with scanning signals).

Each of the color filters CFR, CFG, and CFB in the present embodiment extends to overlap with the apertures APX(R), APX(G), and APX(B) formed in each of the sub-pixels SPR, SPG, and SPB arranged in the oblique direction with respect to the X direction and the Y direction, in the same manner as the first embodiment.

Figure 9:
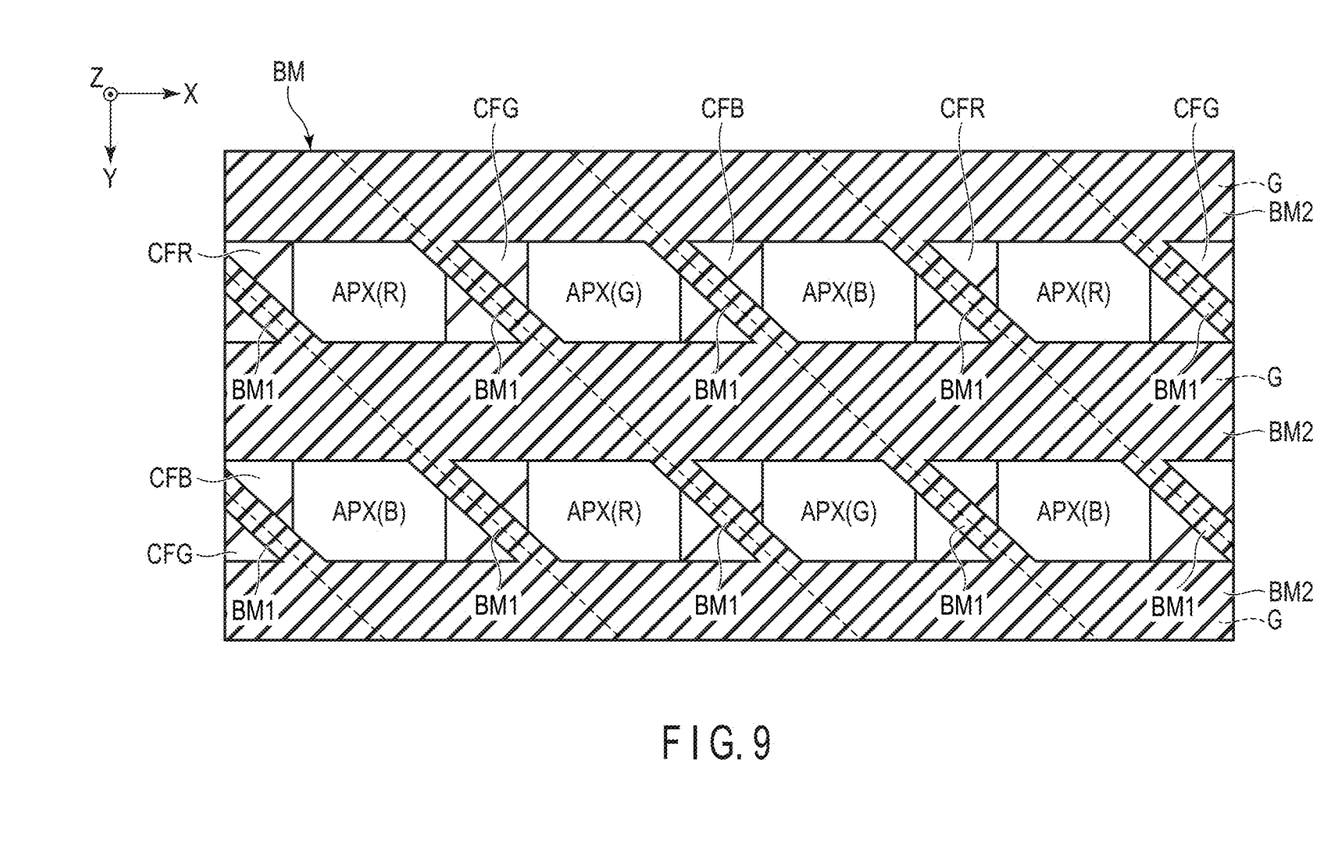
FIG. 9 shows an arrangement of a black matrix of a second embodiment.

In this case, the black matrix BM in which a black matrix BM1 extending in the oblique direction to overlap with the boundary portion of the adjacent color filters and a black matrix BM2 extending in the X direction to overlap with the scanning line G are arranged, as shown in FIG. 9.

The case where the metal wiring line included in the display device 1 is the scanning line G is described above. The case where the metal wiring line included in the display device 1 is signal line S (signal line S extending in the Y direction to supply the switching element SW with the video signal) is assumed.

Figure 10:
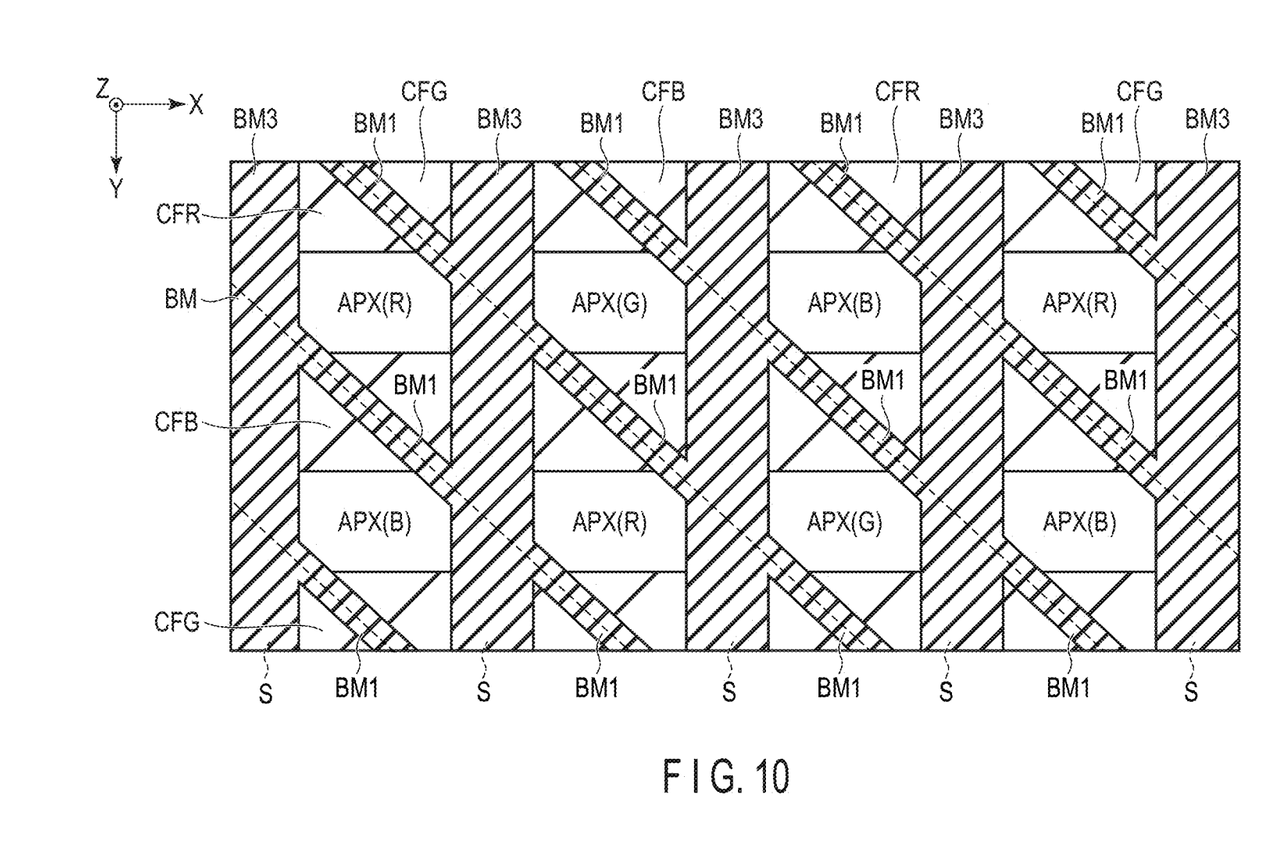
FIG. 10 shows another example of the arrangement of the black matrix.

In this case, the black matrix BM in which the black matrix BM1 extending in the oblique direction to overlap with the boundary portion of the adjacent color filters and a black matrix BM3 extending in the Y direction to overlap with the signal line S are arranged, as shown in FIG. 10.

Figure 11:
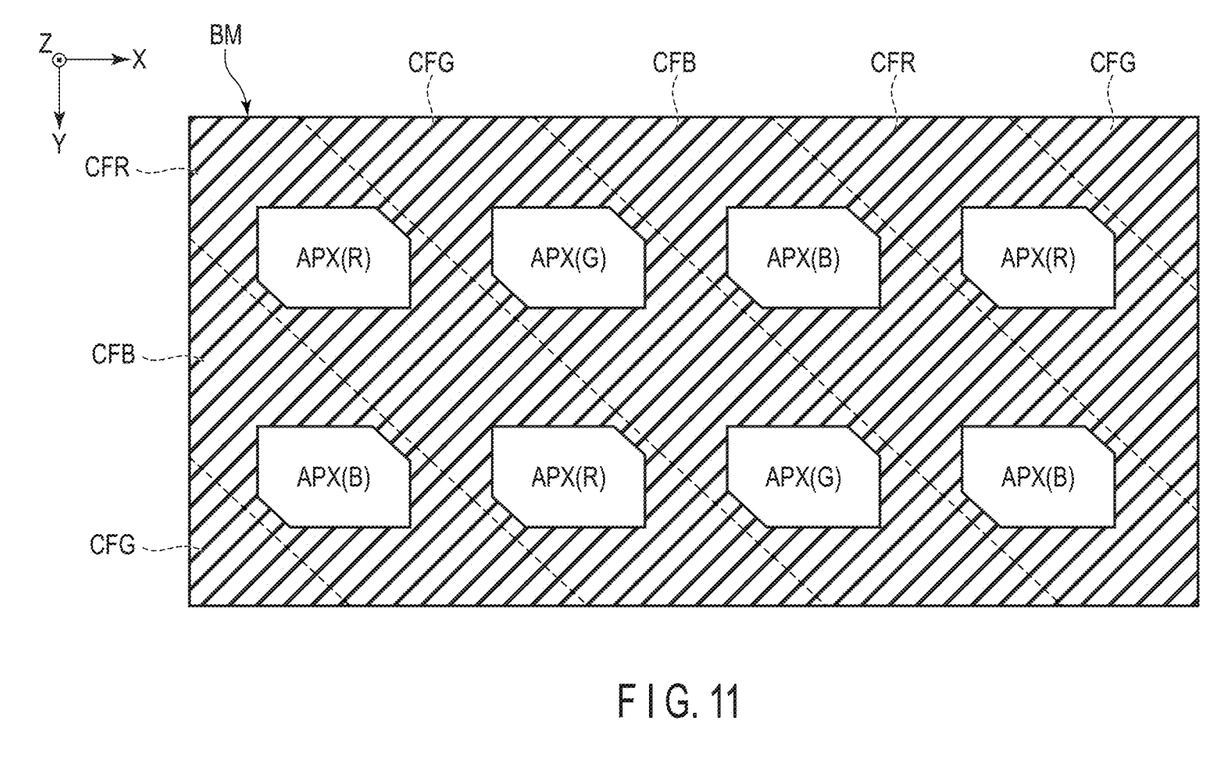
FIG. 11 shows still another example of the arrangement of the black matrix.

The black matrix BM overlapping with the boundary portion of the adjacent color filters, the scanning lines G, and the signal lines S may be arranged by combining the configurations shown in FIG. 9 and FIG. 10, as shown in FIG. 11.

The present embodiment can suppresses the reflection of outer light in at least one of the scanning lines G and the signal lines S by arranging the black matrix BM overlapping at least one of the scanning lines G and the signal lines S. Thus, the present embodiment can increase the visibility of the images displayed in the display device 1.

In the present embodiment, a case where the black matrix BM1 extending in the oblique direction to overlap with the boundary portion of the adjacent color filters and one of the black matrix BM2 and the black matrix BM3 that overlap with at least one of the scanning lines G and the signal lines S are formed integrally (arranged on the same layer). The present display device 1 includes another configuration in which the reflection of the outer light caused by the metal wiring line such as the scanning lines G and the signal lines S is suppressed.

More specifically, in the present embodiment, the black matrix BM2 or BM3, which suppresses the metal wiring line being irradiated with outer light may be arranged on layers different from the black matrix BM1. More specifically, the present invention may have a configuration in which the black matrix BM1 extending in the oblique direction to overlap with the boundary portion of the adjacent color filters is arranged in the second substrate SUB2 (color filter substrate) side, as described in the first embodiment, and the black matrix BM2 or BM3 (or light-shielding layer corresponding thereto) may be arranged at a position overlapping with the scanning lines G and the signal lines S on the first substrate SUB1 side.

In the present embodiment, the black matrix BM1 extending in the oblique direction to overlap with the boundary portion of the adjacent color filters may be arranged on the second substrate SUB2 (color filter substrate) side and a reflection prevention layer may be formed on the surfaces of the metal wiring line (the scanning lines G or the signal lines S) in order to decrease the reflectance of outer light in the metal wiring line. The reflection prevention layer is formed of a metal oxide or black resin and has a reflectance lower than that of the metal wiring line. When the reflection prevention layer is formed in the metal wiring line, the black matrix BM2 or BM3, which overlaps with the scanning lines G or the signal lines S may be omitted.

All display devices and color filter substrates, which are implementable with arbitrary changes in design by a person of ordinary skill in the art based on the display devices and color filter substrates described above as the embodiments of the present invention, belong to the scope of the present invention as long as they encompass the spirit of the present invention.

Various modifications are easily conceivable within the category of the idea of the present invention by a person of ordinary skill in the art, and these modifications are also considered to belong to the scope of the present invention. For example, additions, deletions or changes in design of the constituent elements or additions, omissions or changes in condition of the processes may be arbitrarily made to the above embodiments by a person of ordinary skill in the art, and these modifications also fall within the scope of the present invention as long as they encompass the spirit of the present invention.

In addition, the other advantages of the aspects described in the above embodiments, which are obvious from the descriptions of the specification or which are arbitrarily conceivable by a person of ordinary skill in the art, are considered to be achievable by the present invention as a matter of course.

What is claimed is:

1. A display device comprising:
    a first substrate comprising a plurality of pixels arranged in a matrix in a first direction and a second direction;
    a second substrate opposed to the first substrate and comprising a plurality of color filters corresponding to the plurality of pixels and a light-shielding layer; and
    a liquid crystal layer held between the first substrate and the second substrate, wherein
    the plurality of pixels include a plurality of first pixels arranged in an oblique direction with respect to the first direction and the second direction and a plurality of second pixels adjacent to each of the plurality of first pixels in the first direction and arranged in the oblique direction,
    the plurality of color filters include a first color filter configured to extend in the oblique direction to overlap with the plurality of first pixels and a second color filter configured to extend in the oblique direction to overlap with the plurality of second pixels, and
    the light-shielding layer is configured to extend in the oblique direction to overlap with a boundary portion between the first color filter and the second color filter.

2. The display device of claim 1, wherein
    widths of the first and second color filters, which extends in the oblique direction, in a direction intersecting the oblique direction are constant.

3. The display device of claim 2, wherein
    the light-shielding layer is configured to overlap with a part of an aperture formed in each of the plurality of first pixels and a part of an aperture formed in each of the plurality of second pixels.

4. The display device of claim 1, wherein
    each of the plurality of pixels includes a pixel electrode arranged in the pixel and a switching element connected to the pixel electrode,
    the first substrate comprises a scanning line configured to extend in the first direction to supply a scanning signal to the switching element, and
    the light-shielding layer is configured to farther extend to overlap with the scanning line.

5. The display device of claim 1, wherein
    each of the plurality of pixels includes a pixel electrode arranged in the pixel and a switching element connected to the pixel electrode,
    the first substrate comprises a signal line configured to extend in the second direction to supply a video signal to the switching element, and
    the light-shielding layer is configured to farther extend to overlap with the signal line.

6. The display device of claim 1, wherein
each of the plurality of pixels includes a pixel electrode arranged in the pixel and a switching element connected to the pixel electrode,
the first substrate comprises a scanning line configured to extend in the first direction to supply a scanning signal to the switching element and a signal line configured to extend in the second direction to supply a video signal to the switching element, and
the light-shielding layer is configured to farther extend to overlap with the scanning line and the signal line.

7. A color filter substrate for holding a liquid crystal layer between an array substrate comprising a plurality of pixels arranged in a matrix in a first direction and a second direction and the color filter substrate, the color filter substrate, comprising:
a plurality of color filters corresponding to the plurality of pixels; and
a light-shielding layer, wherein
the plurality of pixels include a plurality of first pixels arranged in an oblique direction with respect to the first direction and the second direction and a plurality of second pixels adjacent to each of the plurality of first pixels in the first direction and arranged in the oblique direction,
the plurality of color filters include a first color filter configured to extend in the oblique direction to overlap with the plurality of first pixels and a second color filter configured to extend in the oblique direction to overlap with the plurality of second pixels, and
the light-shielding layer is configured to extend in the oblique direction to overlap with a boundary portion between the first color filter and the second color filter.

8. The color filter substrate of claim 7, wherein
a display area, in which the color filter substrate or the plurality of pixels are arranged, has a rectangular shape having a first side along the first direction and a second side along the second direction.

9. The color filter substrate of claim 7, wherein
a display area, in which the color filter substrate or the plurality of pixels are arranged, has a polygonal shape at least having a side along a direction intersecting the first direction and the second direction.

* * * * *